United States Patent [19]

Kaufman, Jr. et al.

[11] 3,807,919
[45] Apr. 30, 1974

[54] EXTRUDER FOR MAKING ANNULAR BODIES WITH AN ANNULAR FILLING

[75] Inventors: Harold B. Kaufman, Jr., New York; Howard Roth, Bronx; John P. McCarthy, College Point, all of N.Y.

[73] Assignee: DCA Food Ind., Inc., New York, N.Y.

[22] Filed: Mar. 29, 1972

[21] Appl. No.: 239,078

[52] U.S. Cl................................. 425/133, 425/288
[51] Int. Cl............................................ A21c 11/16
[58] Field of Search .......... 425/287, 288, 133, 380, 425/462

[56] References Cited
UNITED STATES PATENTS

| | | | |
|---|---|---|---|
| 3,126,842 | 3/1964 | Belshaw | 425/287 |
| 3,653,336 | 4/1972 | Kaneko et al. | 425/133 |

*Primary Examiner*—R. Spencer Annear
*Attorney, Agent, or Firm*—Amster & Rothstein

[57] ABSTRACT

An apparatus for simultaneously extruding a raw annular dough ring and an annular filling therewith. A generally cylindrical filling extrusion mechanism, in communication with a pressurized source of filling, is contained within and surrounded by a generally cylindrical dough-extrusion mechanism which is in communication with a pressurized source of dough. The apparatus has an automatic programmed control in operative relation therewith for controlling the filling rates, duration of operation and relative times of initiation of the dough and filling extrusion cycles thereby permitting various relative orientations of the filling and the dough. The apparatus is readily assembled and dismantled for cleansing and maintenance and is compatible with existing equipment requiring only slight modification thereof.

14 Claims, 11 Drawing Figures

PATENTED APR 30 1974 3,807,919

EXTRUDER FOR MAKING ANNULAR BODIES WITH AN ANNULAR FILLING

The present invention relates generally to a machine for the manufacture of an extruded food product of two different foodstuffs, and in particular to an extruder for simultaneously extruding a dough ring having an annular filling useful in the filling of doughnut-shaped products with jelly, creme or other food compositions.

In a typical machine for manufacturing a dough ring or annulus, there is a dough-extruding mechanism which includes a stationary nozzle body terminating in a nozzle opening and defining a chamber adapted to be connected in communication with a dough source. A cutter sleeve is mounted on the nozzle body and is movable relative thereto; and a cutter disc arranged coaxial with the cutter sleeve is mounted on the nozzle body for movement relative to both nozzle body and the cutter sleeve. The cutter disc is normally spaced from and below the nozzzle opening to define a radially outwardly opening dough-extrusion orifice, with the cutter sleeve being normally disposed to close the dough-extrusion orifice. The movement of the cutter disc and the cutter sleeve relative to the nozzle body is effective to selectively open the dough-extrusion orifice for extruding a predetermined quantity of dough into a ring or annulus; and as the cutter sleeve moves to close off the dough-extrusion orifice, the ring or annulus is completed and cut and then may be the further processed, as by being baked or fried.

Although methods and apparatus have been suggested for enclosing fillings in an annular configuration within a dough ring or annulus, such methods and apparatus do not meet the multiple requirements for commercially acceptable extruders. In accomplishing filling simultaneous with extrusion of the raw product from the cutter, it would be highly desirable to achieve such simultaneous functions with but minimal modification of existing doughnut-manufacturing equipment. Further, the resulting apparatus should be of a construction which is readily assembled and dismantled and is easily cleaned and maintained in accordance with recognized sanitary codes. Further, it should be sufficiently flexible to handle a wide variety of product fillings, to provide controlled filling rates per unit product, to attain various orientations of the filling relative to the dough ring and to facilitate ease of automatic continuous operation, yet exhibit the requisite production flexibility and achieve the overall objectives of dependability, safety, simplicity of design and economy of construction.

Broadly, it is an object of the present invention to provide a machine for the manufacture of an extruder food product of two different foodstuffs which realizes one or more of the aforesaid objectives. Specifically, it is within the contemplation of the present invention to provide an extruder for simultaneously extruding a dough ring having an annular filling in which both the weight and shape of the dough ring and filling and their relative locations to each other can be programmed and readily controlled such that a wide variety of doughnuts and like torroidal products can be manufactured with such equipment.

It is a further object of the present invention to provide an extruder which simultaneously extrudes a dough product having a filling which can be constructed with minimal modification of existing doughnut equipment and satisfies the practical requirements for such equipment including ease of assembly and disassembly, facility for cleaning and maintenance in accordance with sanitary codes, dependability, safety, simplicity in design and economy of construction.

In accordance with an illustrative embodiment demonstrating objects and features of the present invention, there is provided a machine for the manufacture of an extruded food product of two different foodstuffs, such as a dough ring containing a filling of jam, jelly, creme or the like. The machine includes a first pressurized tank adapted to receive a supply of the first foodstuff and a second pressurized tank adapted to receive a supply of the second foodstuff. First extruding mechanisms are provided including a nozzle body having a first chamber in communication with the first tank and a cutter mechanism having a cutter sleeve and a cutter disc movably mounted on the nozzle body relative to each other and coacting with each other and the nozzle body to define a radially outwardly opening first extrusion orifice. The cutter sleeve and the cutter disc normally close the first extrusion orifice and progressively open the same in response to their relative movement. Second extruding mechanisms having outer and inner concentric shell members coact to define a second chamber within the first chamber. The second chamber is in communication with the second tank. Means mount the shell members for relative movement, with the shell members coacting with each other when opened to define a radially outwardly opening second extrusion orifice generally confronting the first extrusion orifice. The shell members normally close the second extrusion orifice and progressively open the same in response to their relative movement. A programmed controller is provided for selectively actuating the first and second extruding mechanisms. By appropriately programming such controller, the several parameters of interest may be selected by the machine operator to make products of different relative shapes and geometries.

The above brief description, as well as further objects, features and advantages of the present invention will be more fully appreciated by reference to the following detailed description of a presently preferred, but nonetheless illustrative embodiment in accordance with the invention, when taken in conjunction with the accompanying drawings, wherein:

Referring now to the drawings, there is shown in FIGS. 1 through 6, an extruder 20 for extruding a dough ring R having an annular filling F embodying features of the present invention. The extruder 20 includes a cylindrical elongated nozzle body or head 22 supported in a stationary position in any convenient fashion, as on the frame or chassis of the machine. At its upper end, the nozzle body 22 is formed with an outwardly directed mounting flange 22a which carries a nozzle-mounting coupling 24 which is internally threaded at 26 for attaching the extruder 20 to the outlet end of a pressurized dough-supplying tank 28 (see FIG. 7). At its lower end, nozzle body 22 terminates in a nozzle opening 22b; and contiguous to such nozzle opening, there is provided an undercut 22c which facilitates the mounting and positioning of the filling-extruding mechanisms, to be subsequently described.

Figure 1:
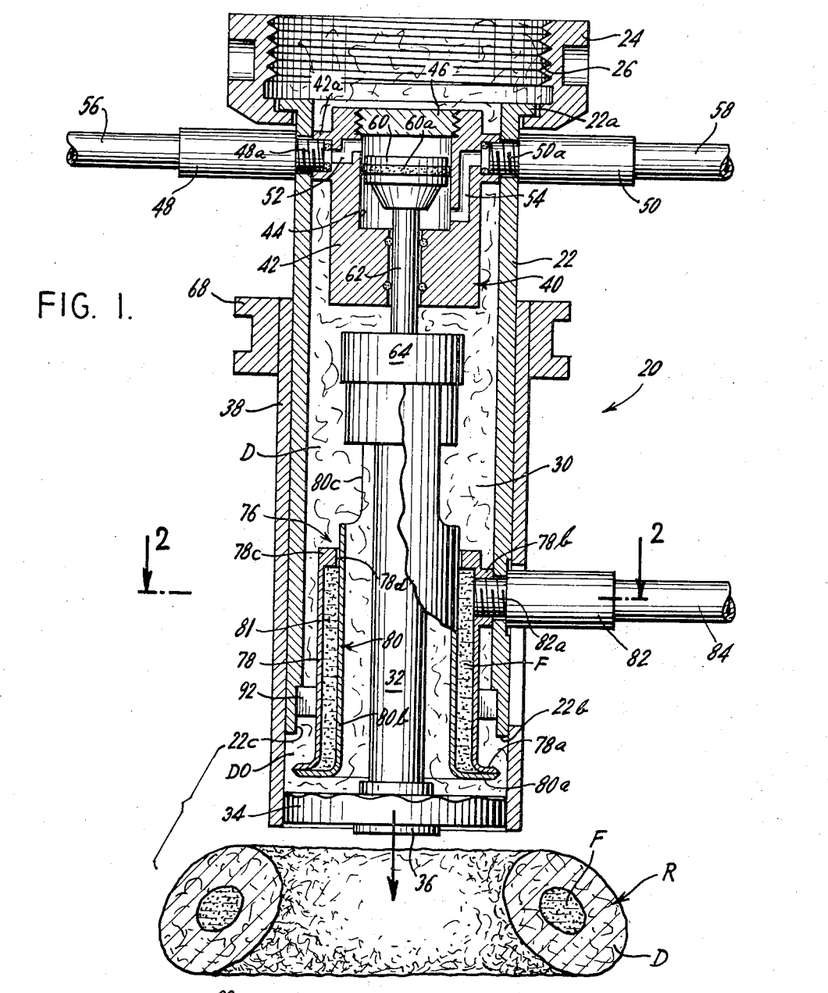
FIG. 1 is an elevational view, with parts in section, of an extruder constructed in accordance with the present invention for simultaneously extruding a dough ring having an annular filling, the extruder being shown in the closed or normal position thereof.
Figure 2:
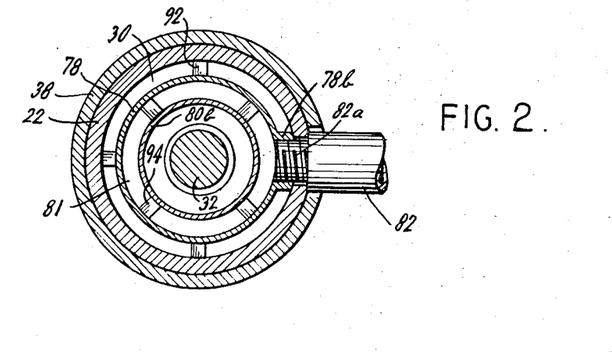
FIG. 2 is a sectional view taken substantially along the line 2—2 of FIG. 1 and looking in the direction of the arrows.

The nozzle body 22 defines an elongated dough-receiving chamber 30 and extending within the chamber 30 (which is filled with dough D from pressurized tank 28) there is provided a pneumatically-actuated cutter disc assembly which includes an axially extending cutter stem 32 which supports a cutter disc 34 at its lower end. Cutter disc 34 is attached to the stem 32 by the usual fastening nut 36 and is dimensioned to coact with a cutter sleeve 38 which is mounted on the nozzle body 22 for movement relative to both the nozzle body 22 and cutter disc 34. The cutter stem 32 is mounted within nozzle body 22 on a pneumatic actuating mechanism, generally designated 40, which includes an air cylinder 42 having a piston chamber 44 which is closed at its upper end by a removable threaded air cylinder seal or plug 46. The air cylinder 42 is removably mounted within the upper end of the nozzle body 22 by the respective connecting and coupling members 48, 50 having theaded nipples 48a, 50a engaging mounting flanges (i.e. flange 42a) which also are used to introduce air to the upper and lower ports 52, 54 of the piston chamber 44, as is generally understood. Air is introduced through air line or pipe 56 and the connecting or coupling member 48 to the upper port 52; and in similar fashion air is introduced through air line or pipe 58 and the connecting and coupling member 50 to lower port 54. Within the piston chamber 44 there is mounted the usual piston 60 having a sealing ring 60a which is displaced through the requisite stroke by the selective introduction of air into the upper and lower ports 52, 54. Depending from piston 60 is a piston rod 62 which via piston rod connector 64 and appropriate threaded couplings (not shown) supports depending cutter stem 32 and cutter disc 34. By the controlled and selective introduction of air into the pneumatic actuating mechanism 40, cutter disc 34 and the mechanisms associated therewith may be moved through a downward disc stroke (i.e. by introducing air into upper port 52 and connecting lower port 54 to atmosphere); and similarly, cutter disc 34 may be moved through an upward disc stroke (i.e. by admitting air to lower port 54 and connecting upper port 52 to atmosphere). In the normal or starting position for an extrusion or cutting cycle, air is admitted to lower port 54, to maintain the cutter disc 34 in its uppermost position as illustrated in FIG. 1.

Figures 3, 4, 5, 6:
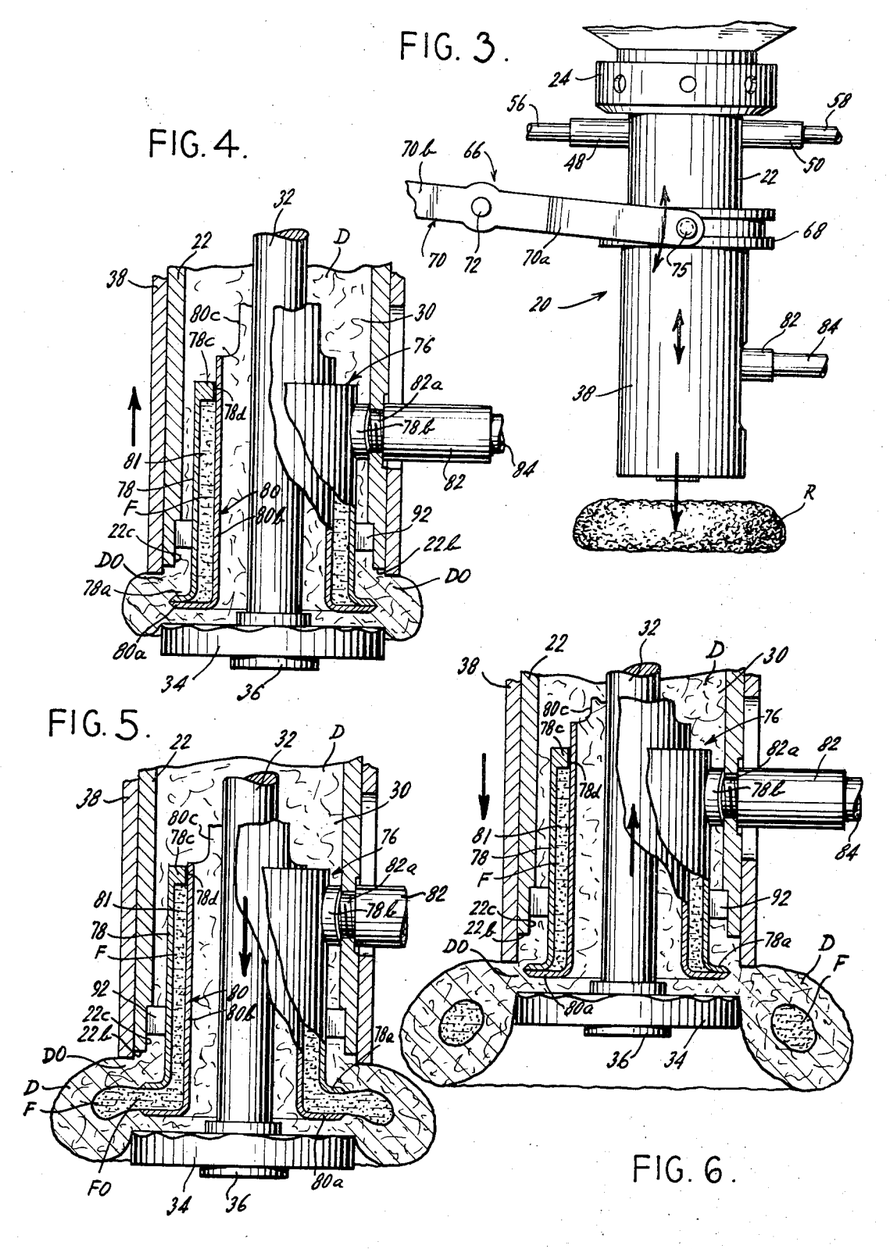
FIG. 3 is an elevational view, on a reduced scale, showing the exterior of the extruder including its conventional cutter-actuating mechanism.
FIG. 4 is a fragmentary section similar to FIG. 1 showing the extruder at the start of an extrusion cycle at the beginning of the formation of an elemental dough ring and prior to the commencement of filling thereof, with the cutter sleeve having progressed upwardly from its normal position closing the dough-extrusion orifice.
FIG. 5 is a fragmentary sectional view similar to FIG. 4 but with the extrusion having progressed to the point where the cutter sleeve has moved upwardly to fully open the dough-extrusion orifice and the inner shell member with cutter disc has moved downwardly to initiate extrusion of the filling into the forming dough ring.
FIG. 6 is a fragmentary sectional view similar to FIG. 5, with the extrusion having progressed to the point where the filling has been completed and the cutter sleeve having commenced its downward stroke to substantially complete the doughnut ring.
Figure 7:
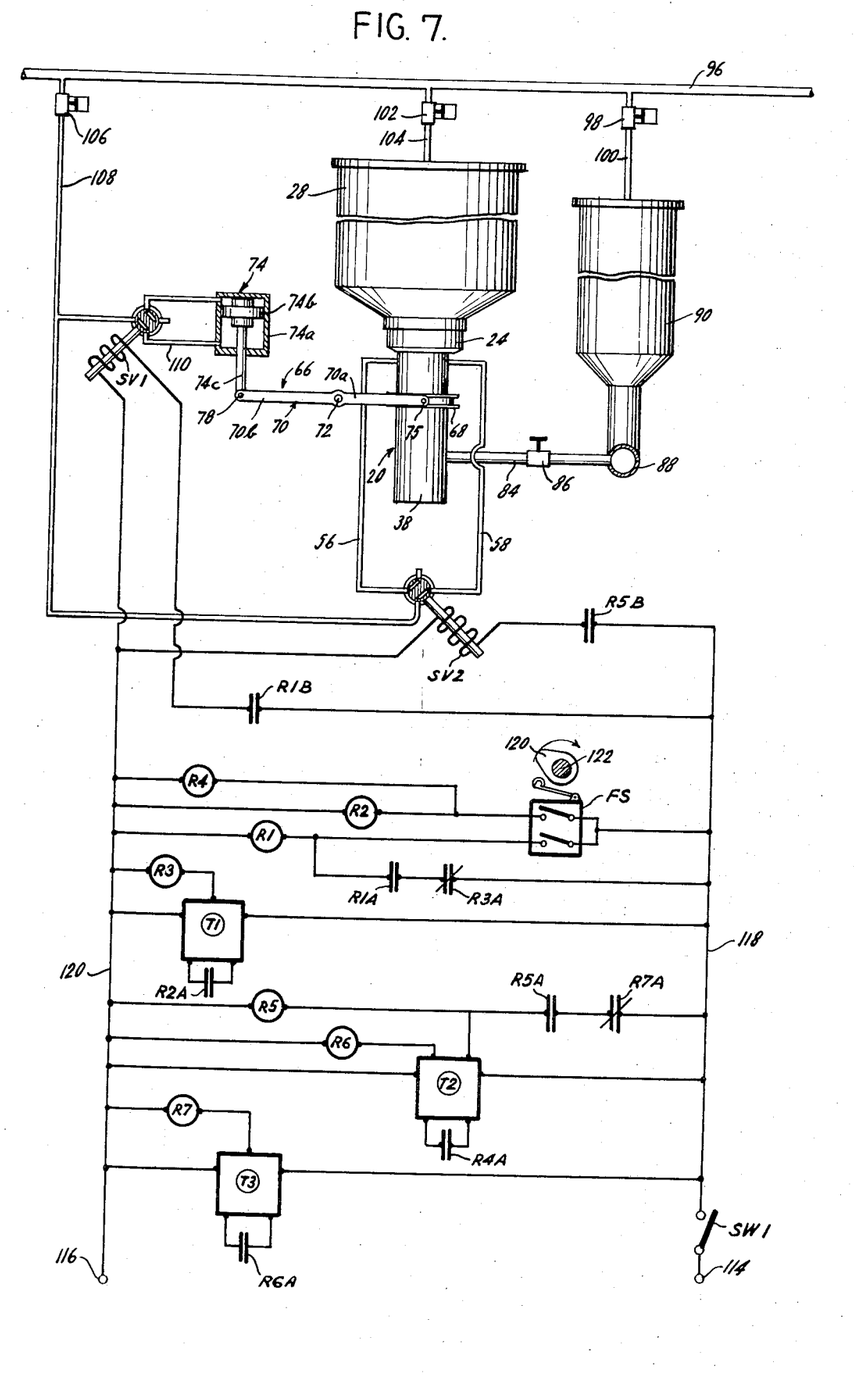
FIG. 7 is a diagramatic and schematic view of the overall extruding machine and its programmed controller.

The reciprocating cutter sleeve 38 is moved through an upward cutter stroke (compare FIGS. 1 and 4) and a downward cutter stroke (compare FIGS. 6 and 1) by conventional cutter-actuating mechanisms 66, seen best in FIGS. 3 and 7. The cutter-actuating mechanisms 66 include a circumferentially-grooved follower collar 68 mounted on the upper end of cutter sleeve 38 and connected via a double-arm lever 70 centrally pivoted at 72 to a double-acting piston and cylinder 74. The arm 70a of lever 70 which extends toward follower 68 is bifurcated and carries diametrically opposed follower rollers 75 engaged within follower collar 68. The other arm 70b of lever 70 is connected at pivot 78 to the piston rod 74c which projects from piston head 74b within the cylinder 74a of the pneumatic actuating means 74. When air is introduced into the lower end of cylinder 74a, piston 74b is driven upwardly and the cutter sleeve is in the starting position illustrated in FIG. 1. In this normal or starting position, sleeve 38 closes the dough-extrusion orifice DO defined between cutter disc 34 and the nozzle opening 22b. When the lower end of cylinder 74 is ported to atmosphere and air is introduced into the upper end of cylinder 74a, piston 74b is driven downwardly to move cutter sleeve 38 through its upward stroke to progressively expose the dough-extrusion orifice DO, as may be seen by comparing FIGS. 1 and 4. When the cutter sleeve 38 again moves through its downward stroke, as may be appreciated by progressively comparing FIGS. 6 and 1, the extruded dough ring R which has been progressively formed as shown in FIGS. 4, 5 and 6, is completed and falls from the lower end of extruder 20, as shown in FIG. 1.

Disposed within the nozzle body 22 is an internal filling-extruding mechanism, generally designated by the reference numeral 76, which includes a stationary outer shell member 78 and a movable inner shell member 80. The shell members 78, 80 cooperate to define a vertically extending, elongated annular filling-receiving chamber 81 which receives the filling F. The outer and inner shell members 78, 80 terminate respectively at their lower end in upper and lower radially and outwardly extending orifice-defining flanges 78a, 80a which are disposed one above the other and are arranged to normally abut and close the filling-extrusion orifice FO which they define, as shown in FIGS. 1 and 4. In response to the downward movement of inner shell member 80 and its orifice-defining flange 80a, the filling-extrusion orifice FO is opened and the filling F is extruded therefrom, as may be appreciated by comparing FIGS. 4 and 5. As the movable orifice-defining flange 80a moves downwardly relative to stationary orifice-defining flange 78a, the vertical extent of the filling-extrusion orifice FO progressively increases, with the maximum opening being determined by the extent of the downward stroke of the cutter disc 34 with which movable inner shell member 80 moves by virtue of the connection to the piston rod connector 64.

Turning now to the specific construction of the internal filling-extruding mechanism 76, it is seen that the outer shell member 78 is formed with a filling-inlet port formed by a radially and outwardly extending internal threaded flange 78b which is seated against the inner wall of nozzle body 22. Flange 78b is mounted by the connecting and coupling member 82 which has a threaded nipple 82a extending through the nozzle wall and engaged with an appropriate internal thread on the port-defining flange 78b. Connecting member 82 also couples feed line 84 to the filling-receiving chamber 81, which feed line in turn is connected via manually operated hand-control valve 86 and manifold 88 to a pressurized filling-supply tank 90 (see FIG. 7).

Projecting radially outwardly from the outer shell member 78 are a plurality of spacers 92 which are fixed to shell member 78 and seated within undercut 22c at the lower end of nozzle body 22. The spacers 92, which are three in number (see FIG. 2) stabilize and support the outer shell member 78. Additionally, outer shell member 78 is formed with an integral inwardly extending top flange 78c which cooperates with the inner shell member 80 to close the top of the chamber 81. The top flange 78c is provided with a central opening 78d sized to receive the movable inner shell member 80 which has a body section 80b of a greater vertical extent than outer shell member 78 and is suspended from the piston rod connector or head 64 by its reduced and relieved away neck section 80c and an appropriate threaded coupling. The inner shell member 80 may be provided with outwardly extending positioners or spacers 94 (see FIG. 2) which ride along the inner wall of outer shell member 78 incident to movement of inner shell member 80 relative to outer shell member 78. By the described construction, it will be appreciated that the components of the extruder 20 can be readily assembled and dismantled. For example, since nozzle body 22 is of uniform circular section, it can be readily inserted through the nozzle flange 24. Thereupon, outer shell member 78 may be assembled over inner shell member 80 and this sub-assembly can be attached to the piston rod connector 64, as by the threaded coupling. Thereupon the pneumatic actuating mechanism 40, the sub-assembly of the internal filling-extruding mechanism 76, the cutter stem 32 and cutter disc 34 may be assembled within the nozzle body with the various fixed components being secured in place by the connecting and coupling members 48, 50, 82.

Preliminary to describing the remainder of the machine including the programmed controller shown in FIG. 7, it will be helpful to review the operation of the dough-extruding and filling-extruding mechanisms. At the start of a typical cutting or operating cycle, the dough chamber 30 within nozzle body 22 is filled with dough D under pressure, with such dough filling the inner and outer annular spaces between nozzle body 22 and stem 32, both at the inside and outside of the internal annular filling-extruding mechanism 76. Also, the filling-extruding mechanism 76 has its annular chamber 81 appropriately loaded with filling F likewise under pressure. The dough-extruding orifice DO is closed due to the relative position of cutter disc 34 and cutter sleeve 38, with the cutter disc 34 being at the upper extremity of its stroke and the cutter sleeve 38 being at the lower extremity of its cutting stroke (see FIG. 1). With cutter disc 34 at the upper end of its stroke, the movable inner shell member 80 is likewise in its uppermost position closing the filling-extrusion orifice FO which confronts and is coextensive with the dough-extrusion orifice DO.

In response to operation of the cutter-actuating mechanism 66, the cutter sleeve 38 moves through its upward stroke, as indicated by the directional arrow in FIG. 4, whereupon the dough D under pressure within chamber 30 begins to extrude radially outwardly through the orifice DO and to form the elemental shape of the dough ring R. Then, when cutter stem 32 is moved downwardly to move cutter disc 34 and the inner shell member 80 through the downward stroke in response to the appropriate porting of the pneumatic actuating mechanism 40, the filling orifice FO opens, as may be appreciated by progressively inspecting FIGS. 4 and 5, and the filling F is extruded into the elemental dough ring under formation. In a sense, the internal filling-extruding mechanism 76 provides a clam-shell action as it progressively opens its radially extending filling orifice which extends substantially in a transverse medial plane in relation to the dough ring under formation. When the requisite amount of filling F is extruded into the elemental dough ring, the filling orifice FO is closed by moving the inner shell member 80 with cutter disc 34 upwardly, as may be appreciated by comparing FIGS. 5 and 6. The upward movement of cutter disc 34 contributes toward the shaping and formation of the elemental dough ring at its under side. Upon closing of the filling orifice FO and upon movement of the cutter sleeve 38 through its downward stroke, as indicated by the directional arrow in FIG. 6, the dough ring is completed with its internal filling F. The dough ring R then drops from the closed cutter disc and sleeve 38, as is generally understood. In general, it will be appreciated that by the appropriate timing of the opening and closing of the dough-extruding orifice DO and the filling-extruding orifice FO and controlling their respective durations, it is possible to control the volume of the dough ring, the volume of the filling, the disposition of the filling relative to the dough ring and the overall shape of the product.

Referring now specifically to FIG. 7, there is shown in diagrammetic and schematic form the overall extruding machine and its program control including the novel extruder 20, the respective pressurized tanks 28, 90 for the two different foodstuffs and the cutter actuating mechanism 66, all as previously described. The pneumatic system for the machine includes a main air supply line 96 fed from any convenient source which is connected over pressure control valve 98 and branch line 100 to pressurized tank 90, over pressure control valve 102 and branch line 104 to pressurized tank 28 and over pressure control valve 106 and branch line 108 to solenoid controlled three way valve SV1 for the double acting piston and cyliner 74 of the cutter actuating mechanism 66. Branch line 108 is also connected to solenoid controlled three way valve SV2 for the double acting piston and cylinder 40 within the nozzle body 22 which is controlled over air lines 56, 58 (see FIG. 1). The valve and pneumatic control positions in FIG. 7 corresponding to the showing in FIG. 1. Accordingly, solenoid controlled three way valve SV1 is positioned to introduce air via branch line 110 to the lower end of cylinder 74a to maintain the cutter sleeve 34 in its downward position (see FIG. 1) and solenoid controlled three way valve SV2 is positioned to connect branch line 108 over line 58 to the lower port 54 of pneumatic control 40 to maintain the cutter disc 34 in its uppermost position in which the filling-extrusion orifice FO is closed.

Turning now to the associated electrical control, terminals 114, 116 are connected to an appropriate source of alternating current, such as an available 115 volt AC power supply. In turn, terminals 114, 116 are connected to lines 118, 120, with main control switch SW1 being provided in line 118. In a typical installation, the extrusion cycle is initiated when switch SW1 is closed by the provision of a fryer-controlled switch FS illustrated as a double pole single throw switch. In a typical commercial installation, fryer control switch FS is closed by a cam 120 on a drive shaft 122 of the fryer which signals the extruder 20 (or multiple extruders in tandem) to provide one or more extrusions to the flight of the fryer conveyor disposed therebeneath.

For clarity of description, the operation of the electrical control will be separated into the cycle for actuating the cutter sleeve 38 and the cycle for operating the cutter disc 34 and internal filling extrusion mechanism 76. However, the sequence of opening and the dwell times for both the cutter sleeve 38 and the cutter disc 34 and inner shell member 80 may be adjusted independently in accordance with the illustrative examples which will be described in conjunction with FIGS. 8 through 11 and variants thereof as will be generally understood by those skilled in the art. Connected over one pole of fryer switch FS is relay R1 which upon being energized, closes normally open contact R1B to operate solenoid controlled three way valve SV1 which ports the pneumatic control 74 of the cutter-actuating mechanism 74 to move the same through its upward stroke from the FIG. 1 position to the FIG. 4 position. Also, relay contact R1A closes in response to energization of relay R1, and over normally closed contact R3A, completes a holding circuit for relay R1 notwithstanding the opening of fryer switch FS; and this holding circuit is disrupted by opening of normally closed contact R3A associated with relay R3. Simultaneously, with the energization of relay R1 over one pole of fryer switch FS, a second relay R2 is energized which, over contact R2A starts timer T1 which is set to establish the desired dough-extrusion interval. When timer T1 times out, as adjusted for the particular product specification, it provides a pulse signal which energizes relay R3 connected across lines 118, 120 over timer T1 which opens normally closed relay contact R3A which is in series with holding contact R1A for relay R1. Thus, when timer T1 times out, relay R1 is deenergized to return solenoid controlled three way valve SV1 to the illustrated position whereupon cutter sleeve 38 is moved through its downward stroke from the FIG. 4 position to the FIG. 1 position to end the dough extrusion interval of the particular cycle. Upon opening of holding contact R1A and contact R1B, which connects solenoid controlled three way valve SV1 across lines 118, 120, the cutter sleeve 38 is again closed as a result of the corresponding operation of the solenoid controlled three way valve SV1.

Now considering the filling extrusion cycle, it will be appreciated that upon closing of fryer switch FS, relay R4 is energized. Relay R4 is connected across lines 118, 120 over the upper pole of fryer switch FS. Relay R4 closes normally open contact R4A to start the timer T2 which determines the interval during which the filling-extrusion mechanism 76 remains closed or in its dwell position. When timer T2 times out, it provides a pulse signal which momentarily energizes relays T5 and R6 which are connected across lines 118, 120 over timer T2. Upon energization of relay R5, a holding circuit for the relay is completed over normally open contact R5A and normally closed contact R7A. Also in response to energization of relay R5, contact R5B, which is normally open and is connected in series with the solenoid controlled three way valve SV2 across line 118, 120, is closed to actuate the solenoid controlled valve SV2. As previously described, this lowers the inner shell member 80 to open the filling-extrusion orifice FO and also lowers the cutter disc 34. In response to energization of relay R6, which occurs at the same time as energization of relay R5, timer T3 is started by closing of normally open relay contact R6A. Timer T3 is set to provide the requisite duration for the filling interval; and when timer T3 times out, it provides a pulse signal which momentarily energizes relay R7. Relay R7 has normally closed contact R7A in the holding circuit for relay R5. Thus, in response to opening of contact R7A, and notwithstanding the fact that contact R5A was previously closed in response to energization of relay R5, relay R5 is opened. This, in turn, opens contact R5B and deenergizes solenoid controlled three way valve SV2 to raise the inner shell member 80 to close the filling extrusion orifice FO and also to raise cutter disc 34.

From the foregoing it will be appreciated that the essential operating parameters for the present extruder may be controlled as follows. First, the rate of production is established by the frequency of the cutting and filling cycles, namely the time intervals between the closing of fryer switch FS. This is determined in the first instance by fryer capacity (i.e. rate of travel of the conveyor flights of the fryer beneath the one or more extruders). Second, the product extrusion may be varied in accordance with the following parameters: (a) shape of both the inner and outer components; (b) quantity of material in either component; (c) relative position (i.e. concentric, off-axis or partially exposed) of the inner and outer components; and (d) cross-sectional configuration of the individual components and of the overall product. The several product parameters are affected interrelatedly by the following process parameters which may be independently adjusted by the operator: (a) opening mode of the cutter sleeve and/or inner shell member; (b) dwell time of the cutter sleeve and/or inner shell member; (c) closing mode of the cutter sleeve and/or inner shell member; (d) stroke length of the cutter sleeve and/or inner shell member; (e) relative opening times for the cutter sleeve and inner shell member; and (f) overlap of the cutter sleeve. Further variations may be achieved by varying extrusion pressure applied to either the inner or outer components of foodstuffs and of course by varying the extrusion characteristics of such components or foodstuffs.

Figure 8:
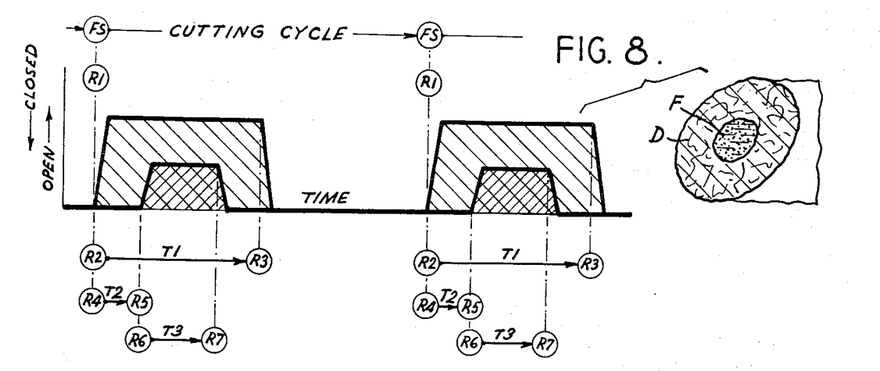
FIG. 8 is a timing diagram for the dough and filling extrusion phases of a typical cutting or operating cycle intended to produce a substantially concentric filling within the dough ring, as illustrated in the typical cross-section to the right of the figure.

In FIGS. 8 to 11 inclusive there are illustrated timing diagrams for the dough and filling-extrusion phases of typical operating cycles intended to produce the corresponding geometries and orientations shown at the right of each such timing diagram. Referring first to FIG. 8, the cutting cycle starts when fryer switch FS and relays R1, R2 and R4 close. The dough-extrusion interval or phase continues for the time interval T1 and is terminated upon energizing of relay R3. The filling-extrusion starts at a delayed time determined by the setting of timer T2 and is brought about by energizing relay R5. The actual filling-extrusion interval is determined by the setting of timer T3 and is initiated by energization of relay R6 and is subsequently terminated in response to energization of relay R7 when timer T3 times out. In the FIG. 8 timing diagram, it is seen that the filling-extrusion interval is substantially equally spaced relative to the commencement of the extrusion interval or phase and the termination thereof. Accordingly, the corresponding geometry results for the doughnut type product illustrated at the right.

Figure 9:
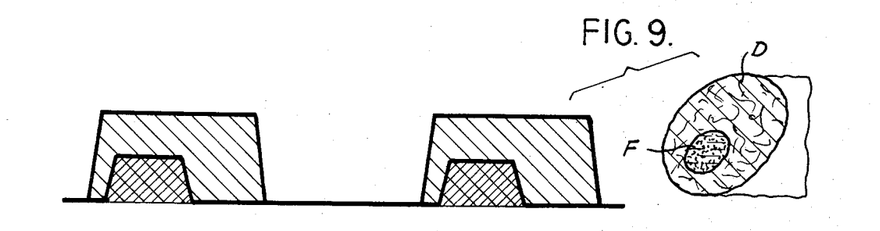
FIG. 9 is a view similar to FIG. 8 but showing a timing diagram for producing a doughnut having an eccentric or inwardly displaced filling, as shown at the right in the figure.

In the illustrative timing diagram of FIG. 9, it will be appreciated that the setting of timer T2 is somewhat shortened such that the filling extrusion interval commences at a time earlier in the operating cycle than for the condition illustrated in FIG. 8. Since the remaining parameters are the same, the overall shape of both the dough and the filling are the same as in the FIG. 8 illustration, but the filling is offset inwardly as compared to FIG. 8.

Figure 10:
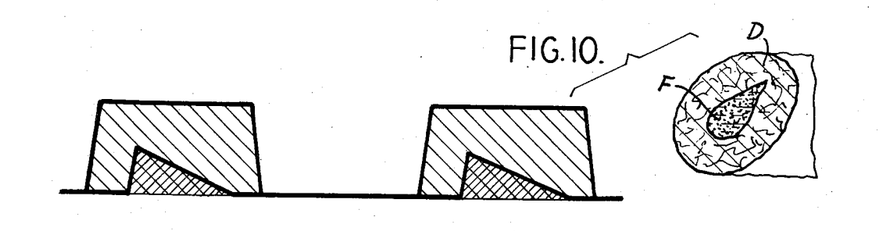
FIG. 10 is a view similar to FIG. 8 but showing a timing diagram for producing a doughnut having a teardrop filling, as shown in the typical cross-section at the right; and, FIG. 11 is a view similar to FIG. 8, but showing a timing diagram to produce a doughnut having a partially exposed filling, as shown in the typical cross-section at the right of the figure.

In the FIG. 10 illustration, the setting of timer T3 and the closing of three way valve SV2 are such that the resulting filling extrusion is of tear-shaped cross-section and of diminishing extent from the inner circumference of the extrusion toward the outer circumference thereof.

Figure 11:
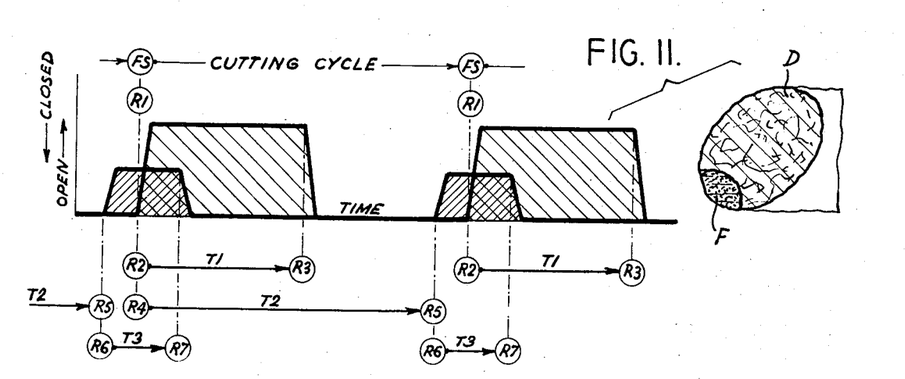

Finally, in the FIG. 11 illustration, the setting of timer T2 and timer T3 is such that the filling orifice opens prior to the dough-extrusion orifice such that the filling is formed at the inner circumference of the resulting product.

From the foregoing illustrative timing diagrams, it will be appreciated that innumerable relative shapes and orientations of the dough and the filling may be achieved by the simple expedient of setting the controls and that a corresponding wide variety of products may be formed by the present machine.

A latitude of modification, change and substitution is intended in the foregoing disclosure and in some instances some features of the invention will be used without a corresponding use of other features. Accordingly, it is appropriate that the claims be construed broadly and in a manner consistent with the scope and spirit of the invention herein.

What I claim is:

1. An extruder for simultaneously extruding a dough ring having an annular filling comprising a dough-extruding mechanism including a nozzle body terminating in a nozzle opening and defining an outer chamber adapted to be connected in communication with a dough source, a cutter sleeve mounted on said nozzle body and movable relative thereto, a cutter disc coacting with said cutter sleeve and mounted within said nozzle body for movement relative to both said nozzle body and said cutter sleeve, said cutter disc being normally spaced from said nozzle opening to define a radially outwardly opening dough-extrusion orifice, said cutter sleeve being normally disposed to close said dough-extrusion orifice, the movement of said cutter sleeve relative to said cutter disc being effective to selectively open said dough-extrusion orifice, an internal filling-extruding mechanism disposed within said nozzle body and including outer and inner members arranged to define an inner chamber adapted to be connected in communication with a filling source, means mounting said outer and inner members for relative movement, said outer and inner members when opened coacting to define a radially outwardly opening filling-extrusion orifice substantially confronting and coextensive with said dough-extrusion orifice and actuating means for said dough-extruding and filling-extruding mechanisms for selectively opening and closing said dough-extrusion orifice and said filling-extruding orifices in timed relation to each other.

2. An extruder according to claim 1 wherein said outer member of said filling-extruding mechanism is stationary and said inner member is mounted for movement with said cutter disc.

3. An extruder according to claim 1 wherein said outer and inner members include upper and lower radially outwardly extending orifice-defining flanges disposed one above the other and arranged to normally abut and close said filling-extrusion orifice and relative movable in substantial parallelism to progressively increase the vertical extent of said filling-extrusion orifice.

4. An extruder according to claim 1 including a cutter stem coaxially of said nozzle body and carrying said cutter disc, said outer member being mounted on said nozzle body coaxially thereof and said inner member being mounted on said cutter stem coaxially thereof whereby said inner chamber is substantially surrounded by said outer chamber.

5. An extruder for simultaneously extruding a ring having a filling comprising a first extruding mechanism including a stationary nozzle body terminating in a nozzle opening and defining a first chamber adapted to be connected in communication with a first extrudable source, a cutter sleeve mounted on said nozzle body and movable relative thereto, a cutter disc coacting with said cutter sleeve and mounted on said nozzle body for movement relative to both said nozzle body and said cutter sleeve, said cutter disc being normally spaced from said nozzle opening to define a radially outwardly opening first extrusion orifice, said cutter sleeve being normally disposed to close said first extrusion orifice, the relative movement of said cutter sleeve to said nozzle body being effective to selectively open said first extrusion orifice, a second extruding mechanism disposed within said nozzle body and including outer and inner members arranged to define a second chamber adapted to be connected in communication with a second extrudable source, means mounting said inner member for movement with said cutter disc relative to said outer member, sai outer and inner members when opened coacting to define a radially outwardly opening second extrusion orifice substantially confronting and coextensive with said first extrusion orifice and actuating means for said first and second extruding mechanisms for selectively opening and closing their respective orifices in timed relation to each other.

6. An extruder according to claim 5 wherein said outer member of said second extruding mechanism is stationary.

7. An extruder according to claim 5 wherein said outer and inner members include upper and lower radially outwardly extending orifice-defining flanges disposed one above the other and arranged to normally abut and close said second extrusion orifice and relatively movable in substantial parallelism to progressively increase the vertical extent of said second extrusion orifice.

8. An extruder according to claim 5 including a cutter stem coaxially of said nozzle body and carrying said cutter disc, said outer member being mounted on said nozzle body coaxially thereof and said inner member being mounted on said cutter stem coaxially thereof whereby said inner chamber is substantially surrounded by said outer chamber.

9. An extruder for simultaneously extruding a ring having a filling comprising a first extruding mechanism including a nozzle body having a nozzle opening and defining a first chamber adapted to be connected in communication with a first extrudable source, a cutter mounted on said nozzle body and movable relative thereto, a disc coacting with said cutter and mounted on said nozzle body for movement relative to both said nozzle body and said cutter, said disc being normally spaced from said nozzle opening to define a first extrusion orifice, said cutter being normally disposed to close said first extrusion orifice and the relative movement of said cutter to said nozzle body being effective to selectively open said first extrusion orifice, a second extruding mechanism disposed within said nozzle body and including outer and inner members arranged to define a second chamber adapted to be connected in communication with a second extrudable source, means mounting one of said outer and inner members for movement with said cutter disc relative to the other of said outer and inner members, said outer and inner members when opened coacting to define a radially outwardly opening second extrusion orifice and actuating means for said first and second extruding mechanisms for selectively opening and closing their respective orifices in timed relation to each other.

10. An extruder according to claim 9 wherein said outer member of said second extruding mechanism is stationary and said inner member is mounted for movement with said cutter disc.

11. An extruder according to claim 10 wherein said outer and inner members include upper and lower radially outwardly extending orifice-defining flanges disposed one above the other and arranged to normally abut and close said second extrusion orifice.

12. An extruder according to claim 11 including a cutter stem coaxially of said nozzle body and carrying said cutter disc, said outer member being mounted on said nozzle body coaxially thereof and said inner member being mounted on said cutter stem coaxially thereof whereby said inner chamber is substantially surrounded by said outer chamber.

13. An extruder comprising a first extruding mechanism including a nozzle body terminating in a nozzle opening and defining a first chamber adapted to be connected in communication with a first extrudable material, a cutter sleeve mounted on said nozzzle body and movable relative thereto, a cutter disc coacting with said cutter sleeve and mounted within said nozzle body for movement relative to said nozzle body, said cutter disc being normally spaced from said nozzle opening to define a first extrusion orifice, said cutter sleeve being normally disposed to close said first extrusion orifice, the relative movement between said cutter sleeve and said nozzle body being effective to open said first extrusion orifice for extruding a ring from said first extrudable material, a second extruding mechanism disposed within said nozzle body and including outer and inner members arranged to define a second chamber adapted to be connected in communication with a second extrudable material, means mounting said outer and inner members for relative movement, said outer and inner members when opened coacting to define a second extrusion orifice for extruding a filler for said ring from said second extrudable material and actuating means for said first and second extruding mechanisms for selectively opening and closing said first and second orifices in timed relation to each other.

14. A machine for forming an annular body having an annular filling comprising a first extruding mechanism adapted to be connected to a first extrudible source for forming said annular body and including means defining a radially outwardly opening first extrusion orifice, a second extruding mechanism disposed within said first extrusion mechanism and adapted to be connected to a second extrudible source, said second extrusion mechanism including means defining a normally closed, radially outwardly opening second extrusion orifice, said second extrusion orifice being disposed substantially medially of said first extrusion orifice and terminating radially inwardly thereof, closure means normally closing said first extrusion orifice, actuating means operatively connected to said closure means for opening said first extrusion orifice to commence the formation of said annular body from said first extrudible source, actuating means operatively connected to said second extrusion mechanism for opening and closing said second extrusion orifice for a predetermined interval in timed relationship to the opening of said first extrusion orifice to introduce a filling from said second extrudible source into said annular body as the latter is being formed and means operatively connected to said closure means for closing said first extrusion orifice after the formation of said annular body.

* * * * *